(12) United States Patent
Nakai

(10) Patent No.: US 10,407,002 B2
(45) Date of Patent: Sep. 10, 2019

(54) GROMMET AND WIRE HARNESS

(71) Applicant: SUMITOMO WIRING SYSTEMS, LTD., Yokkaichi-shi, Mie (JP)

(72) Inventor: Hirokazu Nakai, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/307,342

(22) PCT Filed: Jun. 5, 2017

(86) PCT No.: PCT/JP2017/020773
§ 371 (c)(1),
(2) Date: Dec. 5, 2018

(87) PCT Pub. No.: WO2017/221675
PCT Pub. Date: Dec. 28, 2017

(65) Prior Publication Data
US 2019/0135205 A1    May 9, 2019

(30) Foreign Application Priority Data

Jun. 24, 2016 (JP) .................................. 2016-125168

(51) Int. Cl.
| | | |
|---|---|---|
| B60R 16/02 | (2006.01) | |
| H01B 7/00 | (2006.01) | |
| F16L 5/10 | (2006.01) | |
| H02G 3/22 | (2006.01) | |
| H02G 3/04 | (2006.01) | |

(52) U.S. Cl.
CPC ............ B60R 16/0222 (2013.01); F16L 5/10 (2013.01); H01B 7/0045 (2013.01); H02G 3/0406 (2013.01); H02G 3/22 (2013.01)

(58) Field of Classification Search
CPC .... B60R 16/0222; H02G 3/0406; H02G 3/22; H01B 7/0045
USPC ................................................ 174/72 A, 650
See application file for complete search history.

(56) References Cited

U.S. PATENT DOCUMENTS

2013/0199823 A1* 8/2013 Kanai (Popovici) ........................ B60R 16/0222
174/152 G
2015/0107894 A1    4/2015 Hayashi et al.

FOREIGN PATENT DOCUMENTS

| JP | S55-169017 U | 12/1980 |
|---|---|---|
| JP | H0547675 U | 6/1993 |
| JP | 2015-042023 A | 3/2015 |
| JP | 2015-042024 A | 3/2015 |
| JP | 2015-080340 A | 4/2015 |
| JP | 2016-005382 A | 1/2016 |

OTHER PUBLICATIONS

Jul. 4, 2017 International Search Report issued in International Patent Application No. PCT/JP2017/020773.

* cited by examiner

Primary Examiner — Sherman Ng
(74) Attorney, Agent, or Firm — Oliff PLC

(57) ABSTRACT

A grommet that includes a main body configured to fit into a through hole in a wall and come into contact with a circumferential edge of the through hole; and a reinforcement provided in a through space in the main body and configured to suppress inward distortion of the main body, the through space being open in a same direction as a penetrating direction of the through hole.

2 Claims, 7 Drawing Sheets

GROMMET AND WIRE HARNESS

This application is the U.S. National Phase of PCT/JP2017/020773 filed Jun. 5, 2017, which claims priority to JP 2016-125168 filed Jun. 24, 2016, the entire disclosure of which is incorporated herein by reference.

BACKGROUND

The present disclosure relates to a grommet and a wire harness.

Conventionally, a wire harness equipped with a grommet that can be attached to a through hole which is formed in a wall of a vehicle body, for example, and through which a wire passes, is known (as disclosed in JP 2015-42023A, for example). The intrusion of water into the inside of the wall from the through hole can be prevented by attaching the grommet to the through hole. This grommet has a cylindrical portion that can be fitted into the through hole, and the cylindrical portion is configured to come into close contact with a circumferential edge portion of the through hole.

SUMMARY

However, with the above-described configuration, there is concern that the cylindrical portion will be distorted inward by, for example, stress that is applied to the grommet due to a vehicle layout or high-pressure cleaning water that is sprayed onto the grommet during high-pressure cleaning. If the cylindrical portion is distorted inward, the adhesion to the circumferential edge of the through hole is no longer maintained, and the waterproofness may deteriorate.

An exemplary aspect of the disclosure provides a grommet and a wire harness that can prevent deterioration of waterproofness.

A grommet according to the present disclosure includes a main body configured to fit into a through hole in a wall and come into contact with a circumferential edge of the through hole; and a reinforcement provided in a through space in the main body and configured to suppress inward distortion of the main body, the through space being open in the same direction as a penetrating direction of the through hole, wherein the reinforcement member is cylindrical and conforms to an inner circumferential surface of the main body, and is accommodated in the through space, and the inner circumferential surface of the main body includes a second circumferential surface that is located in close proximity to, or abuts against, an outer circumferential surface of the reinforcement and a first circumferential surface that is inclined so that an opening width of the main body gradually decreases from the second circumferential surface toward an end of the main body in an axial direction thereof.

A wire harness according to the present disclosure includes a plurality of wires; a sheath that encloses the plurality of wires collectively; and the grommet.

According to the present disclosure, the shape of the main body is maintained by the reinforcement, and the adhesion to the circumferential edge of the through hole is maintained. Thus, deterioration of waterproofness can be prevented.

Moreover, in the grommet according to the present disclosure, the reinforcement is cylindrical and conforms to the inner circumferential surface of the main body, and is accommodated in the through space. With this configuration, the shape of the main body can be maintained and the deterioration of waterproofness can be prevented by performing a simple operation of merely accommodating the reinforcement in the through space.

DETAILED DESCRIPTION OF EMBODIMENTS

Figure 1:
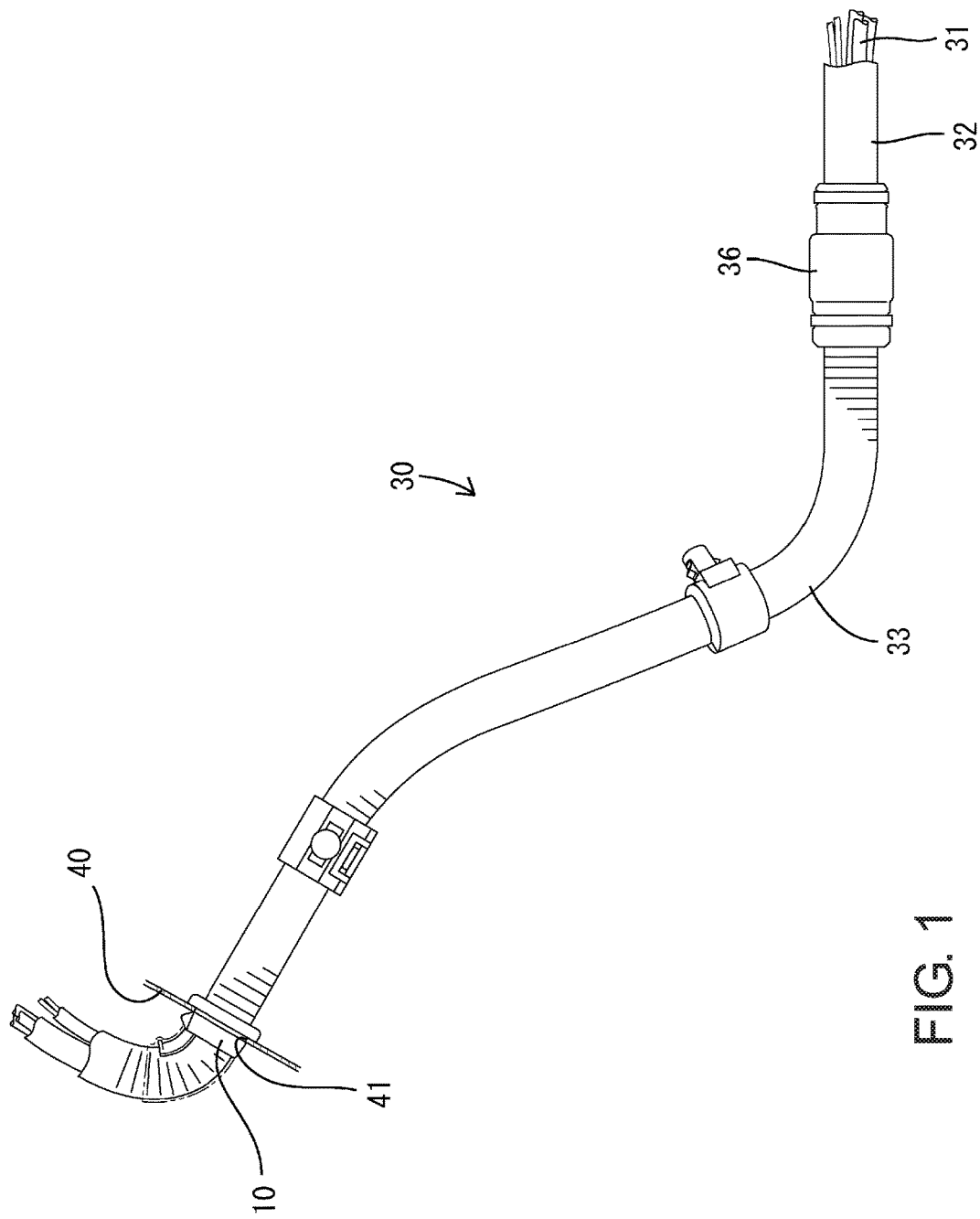
FIG. 1 is a side view showing a portion of a wire harness according to an embodiment of the present disclosure, the portion extending from an exterior side to an interior side of a vehicle.

Preferred embodiments of the present disclosure will be described below.

The grommet according to the present disclosure may also have a configuration in which the reinforcement member (reinforcement) is a corrugated tube that passes through the main body portion (main body), and an outer circumferential surface of the corrugated tube is in close contact with the inner circumferential surface of the main body portion. With this configuration, a liquid-tight joint can be obtained between the grommet and the corrugated tube without having to perform a conventional operation of fixing an end portion of a corrugated tube to a grommet.

Embodiment

Hereinafter, an embodiment of the present disclosure will be described in detail with reference to FIGS. 1 to 7.

A grommet 10 according to this embodiment is included in a wire harness 30 that connects a device installed in a front portion of a vehicle body of a vehicle, such as a hybrid automobile, and a device installed in a rear portion of the vehicle body to each other. The wire harness 30 is mostly disposed under the floor of the vehicle body, and passes through a wall 40 of the vehicle body and is connected to a device located inside the vehicle.

The wire harness 30 includes a plurality of wires 31 and a sheathing member (sheath) that encloses the plurality of wires 31 collectively. Each of the wires 31 is constituted by a conductor and an insulating coating that encloses the outer periphery of the conductor, and has favorable flexibility. Terminal fittings that can be connected to respective devices are connected to both end portions of each wire 31. The sheathing member may be a pipe 32, a corrugated tube 33, and the like that are made of a synthetic resin or a metal. The pipe 32 mainly encloses a portion of the wires 31 that is disposed under the floor (outside the vehicle) and protects the wires 31. The corrugated tube 33 is connected to an end portion of the pipe 32 and encloses a portion of the wires 31 that is desired to be freely bendable, or, mainly a portion of the wires 31 that is disposed above the floor (inside the vehicle).

The corrugated tube 33 is made of a synthetic resin and is a freely bendable, bellows-like tube member in which ridge portions 34 and valley portions 35 are successively provided in an axial direction thereof. The corrugated tube 33 is joined to the end portion of the pipe 32 using a connecting member 36 such as a rubber bush, a cable tie, and the like, in a state in which waterproofness is ensured. The corrugated tube 33 has a circular cross-sectional shape.

The grommet 10 is made of a rubber, is attached to the wall 40 of the vehicle body and axially seals the through hole 41 in the wall 40. The grommet 10 has a main body portion 11 that is fitted into the through hole 41 in the wall 40 and that comes into close contact with the circumferential edge portion of the through hole 41. The main body portion 11 has a flat cylindrical shape with its length in the axial direction being slightly smaller than its length in the direction that is approximately perpendicular to the axial direction. Opposite faces of the main body portion 11 in the axial direction are approximately parallel to each other.

A through space 12 is formed in the main body portion 11, the through space 12 being open to both sides in the axial direction of the main body portion 11. The through space 12 in the main body portion 11 is completely open at both ends thereof in the axial direction of the main body portion 11. The through space 12 has substantially the same circular cross-sectional shape as the through hole 41 in the wall 40.

Figure 6:
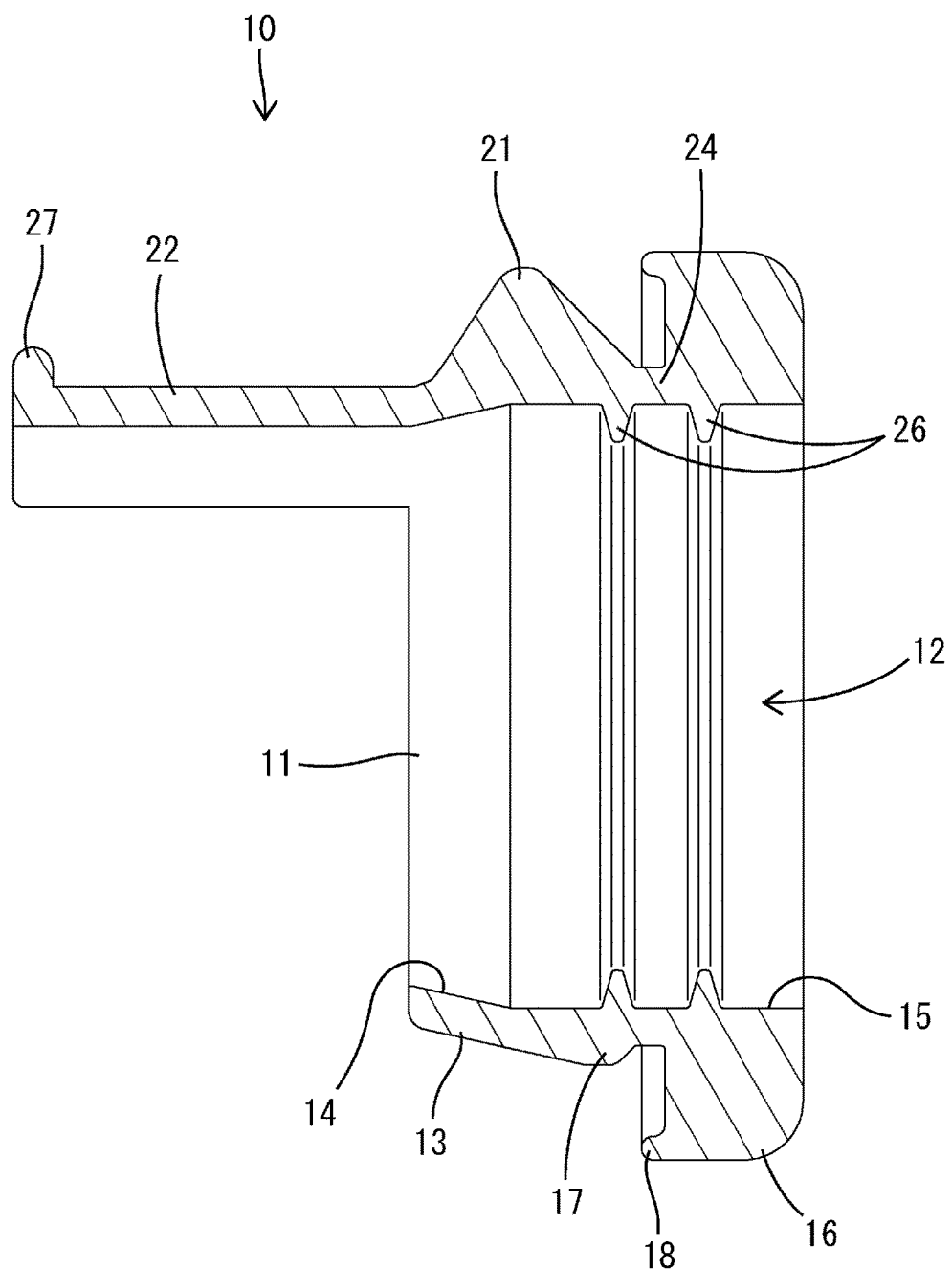
FIG. 6 is a cross-sectional view showing the grommet.

As shown in FIG. 6, an inclined surface (hereinafter referred to as a "first circumferential surface 14") is formed at one end side in the axial direction of the inner circumferential surface of the main body portion 11, the inclined surface being inclined so that the opening width gradually decreases toward the end. Moreover, a surface (hereinafter referred to as a "second circumferential surface 15") that has a constant opening width in the axial direction, or in other words, that is approximately parallel to the axis of the main body portion 11 is formed at a portion of the inner circumferential surface of the main body portion 11 excluding the first circumferential surface 14.

The main body portion 11 is provided with an outer flange portion 16 and an inner flange portion 17 that are disposed on the exterior side and the interior side, respectively, when attached to the wall 40. The outer flange portion 16 and the inner flange portion 17 protrude radially outward from the main body portion 11. In a state in which the grommet 10 is attached to the wall 40, the outer flange portion 16 is in close contact with the outer wall surface of the wall 40, the inner flange portion 17 is in close contact with the inner wall surface of the wall 40, and the wall 40 is thus elastically sandwiched between the outer flange portion 16 and the inner flange portion 17.

The outer flange portion 16 is provided at an end portion (end portion on the exterior side) of the main body portion 11 in the axial direction and extends along the entire circumference of the main body portion 11. The outer flange portion 16 is thicker than the main body portion 11. An outer abutment portion 18 is provided at an outer edge portion of the outer flange portion 16. The outer abutment portion 18 extends continuously along the entire circumference of the outer flange portion 16, and elastically comes into close contact with the wall surface of the wall 40 when the grommet 10 is attached to the wall 40.

The inner flange portion 17 has a smaller external diameter than the outer flange portion 16. Moreover, a tapered portion 13 is formed on one end side (front end side in a direction of attachment to the wall 40) in the axial direction of the main body portion 11 such that the external diameter gradually decreases toward that end.

Figure 3:
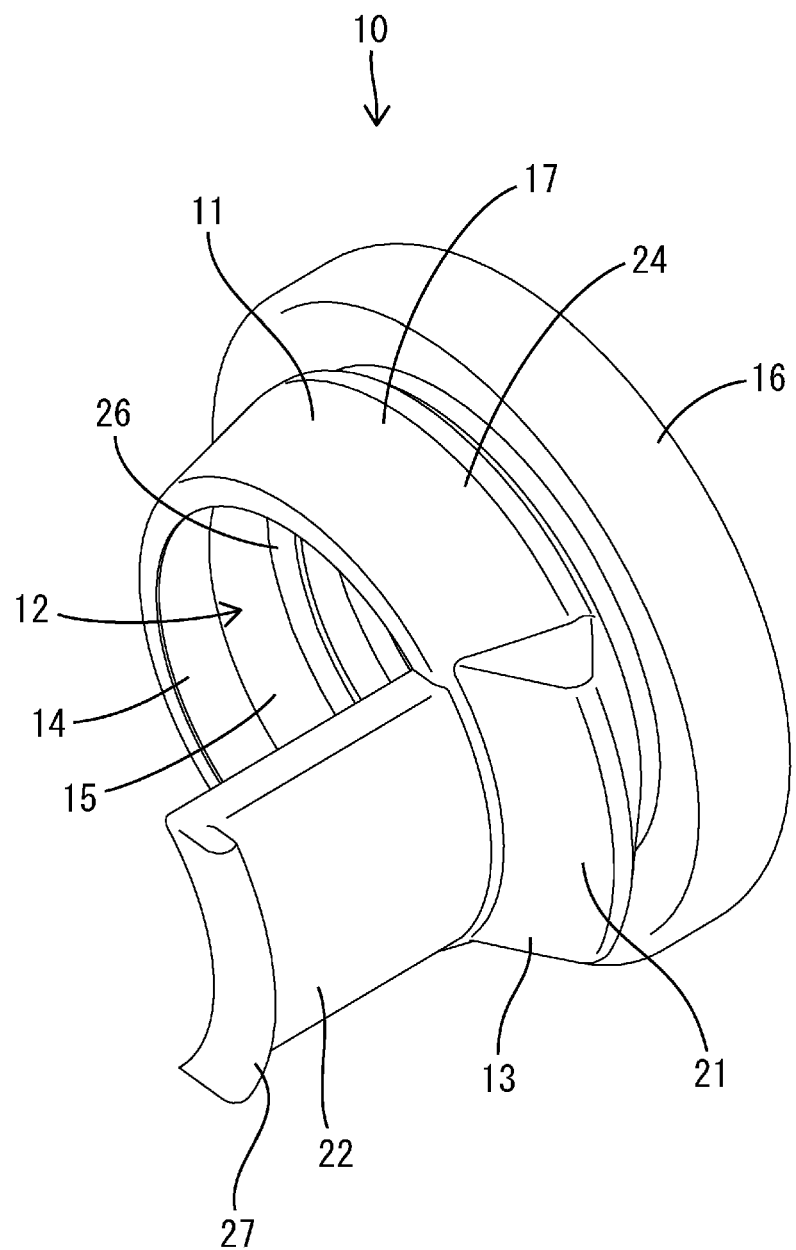
FIG. 3 is a perspective view showing a grommet.
Figure 4:
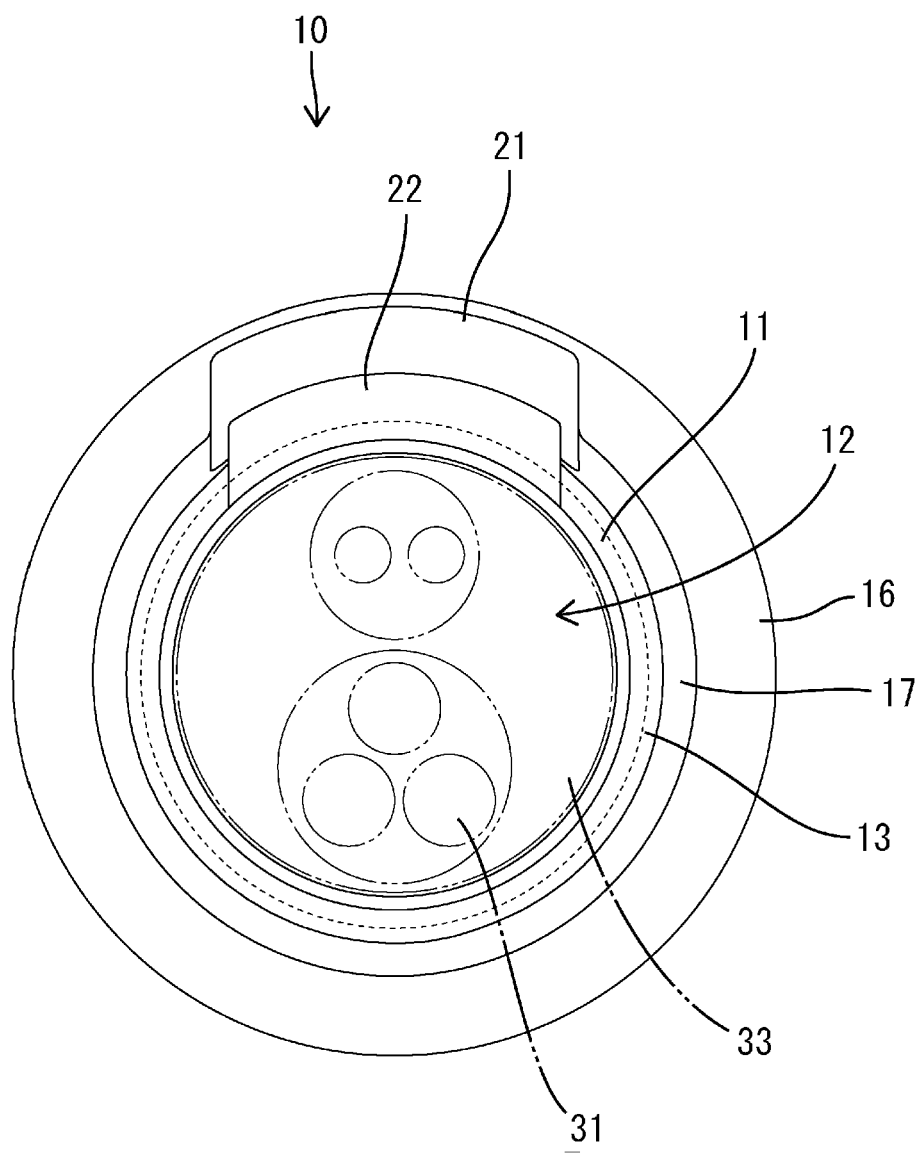
FIG. 4 is a front view showing the grommet.

As shown in FIG. 3, the main body portion 11 is provided with a protruding portion 21 that is formed by a portion of the main body portion 11 in the circumferential direction protruding outward. The protruding portion 21 is a thick portion spanning from the inner flange portion 17 to the tapered portion 13. The protruding portion 21 is shaped like a rib with a substantially triangular cross-sectional shape.

Figure 5:
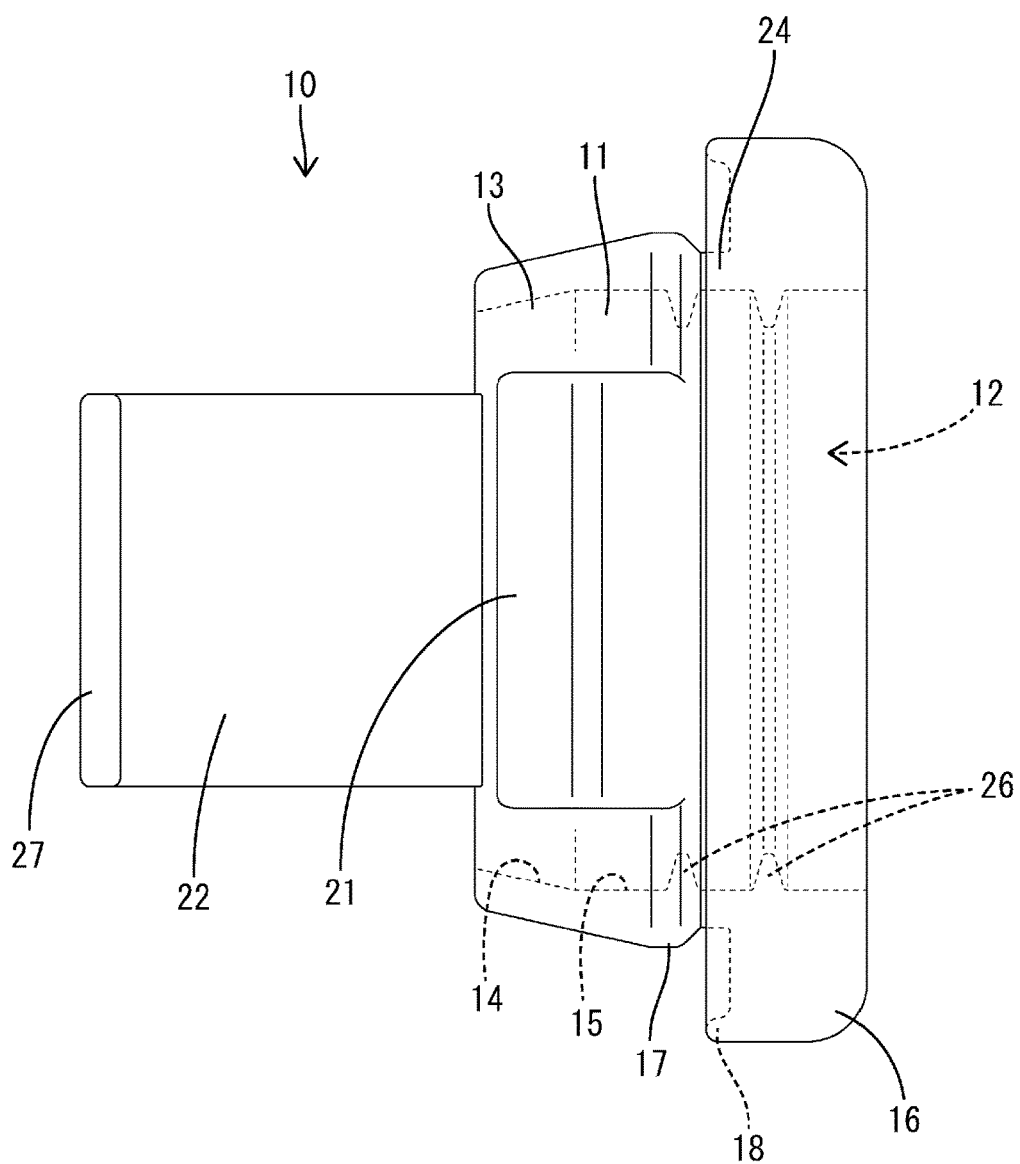
FIG. 5 is a plan view showing the grommet.

As shown in FIG. 5, the main body portion 11 is provided with a strip-shaped portion 22 that protrudes in the axial direction from an end edge of the main body portion 11. The protruding length of the strip-shaped portion 22 is set to be equal to the length of the main body portion 11 in the axial direction, and the width (length in the circumferential direction of the main body portion 11) of the strip-shaped portion 22 is set to be equal to the width of the protruding portion 21. The strip-shaped portion 22 is disposed at the same position as the protruding portion 21 with respect to the circumferential direction of the main body portion 11, and is lined up with the protruding portion 21 in the axial direction. The strip-shaped portion 22 is formed by a portion of the main body portion 11 in the circumferential direction extending in the axial direction, and has a circular-arc cross-sectional shape that is curved along the end edge of the main body portion 11. A projecting rim portion 27 that protrudes radially outward is provided at a protruding end portion of the strip-shaped portion 22. The projecting rim portion 27 is formed along the entire width of the strip-shaped portion 22.

Figure 2:
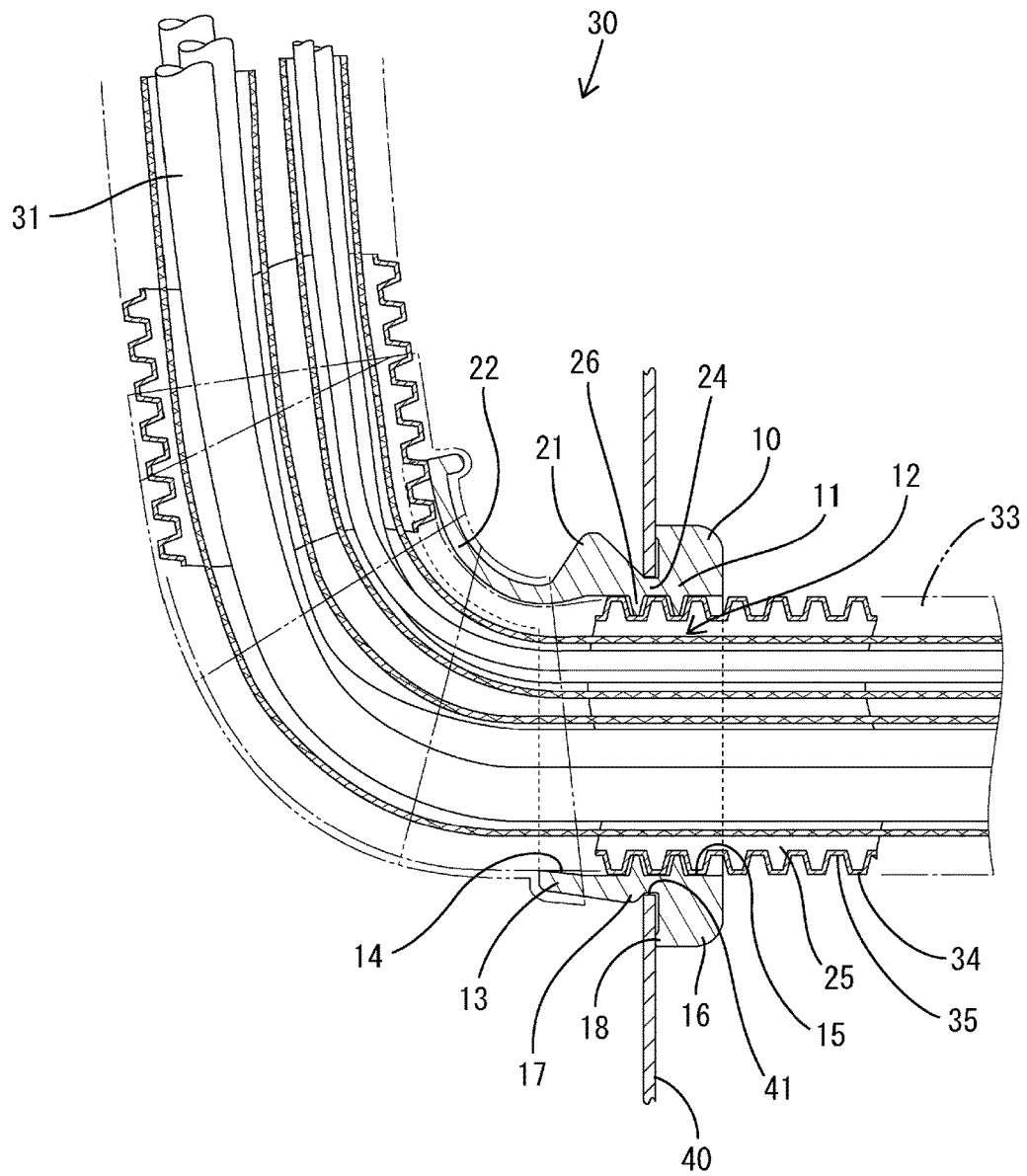
FIG. 2 is an enlarged cross-sectional view showing a portion of the wire harness, the portion extending from the exterior side to the interior side of the vehicle.

As shown in FIG. 2, the main body portion 11 is provided with a sealing portion 24 that can come into close contact with the outer circumferential surface of the corrugated tube 33. The sealing portion 24 is formed in a portion of the main body portion 11 that comes into close contact with the wall 40.

As shown in FIG. 6, the sealing portion 24 has a plurality (two, in this embodiment) of lip portions 26 that protrude from the inner circumferential surface of the main body portion 11. The plurality of lip portions 26 protrude substantially upright from the second circumferential surface 15, and are arranged at predetermined intervals in the axial direction of the main body portion 11. One lip portion 26 of the plurality of lip portions 26 is provided inside the inner flange portion 17, and the other lip portions 26 are provided inside the outer flange portion 16.

Each of the lip portions 26 protrudes inward from the inner circumferential surface of the main body portion 11 and extends continuously in the circumferential direction. Each lip portion 26 has a mountain-shaped cross-sectional shape that can be inserted into a groove portion of the corrugated tube 33. The width (length in the axial direction of the main body portion 11) of each lip portion 26 gradually decreases toward its protruding end. Both side faces (both faces in the axial direction of the main body portion 11) of each lip portion 26 come nearer to each other toward the protruding end with generally the same slope. A protruding end surface of each lip portion 26 is approximately parallel to the second circumferential surface 15.

The plurality of lip portions 26 have the same shape with equal protruding lengths. The protruding length of the lip portions 26 is set to be slightly larger than the depth (recessed length) of the valley portions 35 of the corrugated tube 33.

A reinforcement member 25 that suppresses inward distortion of the main body portion 11 is provided in the main body portion 11. The reinforcement member 25 is the corrugated tube 33 and passes through the through space 12.

Next, an example of an operation for assembling the wire harness 30 according to this embodiment will be described.

First, the outer periphery of the wires 31 is enclosed by a sheathing member. The plurality of wires 31 are bundled together and inserted into the pipe 32, the corrugated tube 33, or the like. Moreover, the pipe 32 and the corrugated tube 33 are joined to each other in the axial direction using the connecting member 36.

Figure 7:
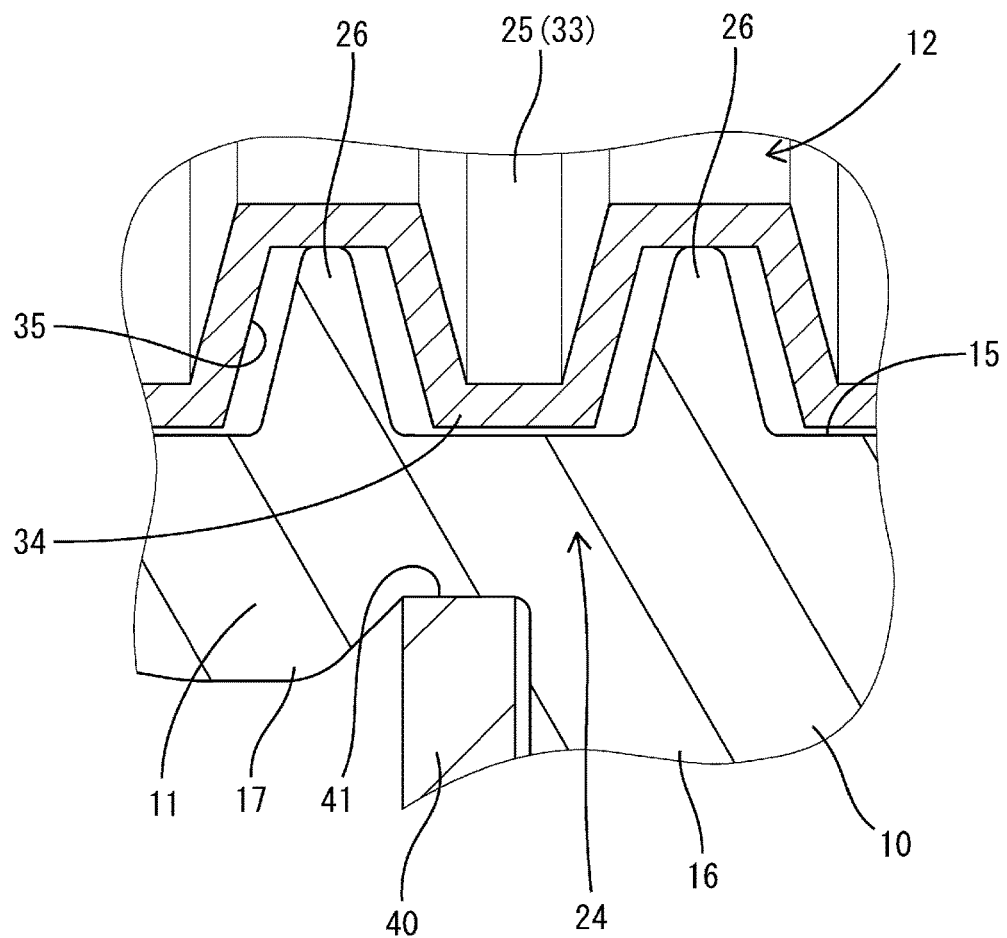
FIG. 7 is a partially enlarged cross-sectional view of the wire harness and shows a state in which a sealing portion of the grommet is in close contact with a corrugated tube.

Next, the grommet 10 is attached to the wire harness 30. The corrugated tube 33 is inserted and fitted into the through space 12 of the grommet 10, and the sealing portion 24 of the grommet 10 is in close contact with the outer circumferential surface of the corrugated tube 33. More specifically, as shown in FIG. 7, the lip portions 26 of the sealing portion 24 are inserted into the valley portions 35 of the corrugated tube 33, the protruding end surfaces of the lip portions 26 elastically abut against bottom surfaces (inner surfaces) of the valley portions 35, and the lip portions 26 are in close contact with the corrugated tube 33 over the entire circumference thereof. Moreover, end surfaces of the ridge portions 34 of the corrugated tube 33 are located in close proximity to, or abut against, the inner circumferential surface of the main body portion 11, and the ridge portions 34 and the lip portions 26 mesh with each other in the axial direction. At this time, at least the first circumferential surface 14 of the main body portion 11 is in close contact with the end surfaces of the ridge portions 34 of the corrugated tube 33.

Then, a fixing means such as a piece of tape is wrapped around the strip-shaped portion 22 of the grommet 10 and the outer circumferential surface of the corrugated tube 33 to thereby fix the grommet 10 at a predetermined position on the corrugated tube 33.

Thus, the operation for assembling the wire harness 30 is completed.

Next, an example of an operation for attaching the wire harness 30 according to this embodiment to a vehicle body will be described.

First, the wire harness 30 is inserted into the through hole 41 in the wall 40. As shown in FIG. 1, an end of the wire harness 30 is inserted into the through hole 41 from the outside of the wall 40 and pulled out on the inside of the wall 40. The corrugated tube 33 and the strip-shaped portion 22, the tapered portion 13, and the inner flange portion 17 of the grommet 10 pass through the through hole 41 in this order. At this time, since the tapered portion 13 and the inner flange portion 17 of the grommet 10 have tapered shapes that taper toward the front end, the insertion into the through hole 41 can be easily performed. Then, when the outer flange portion 16 abuts against the wall surface of the wall 40, the circumferential edge portion of the through hole 41 is sandwiched between the inner flange portion 17 and the outer flange portion 16. In this manner, the main body portion 11 comes into close contact with the circumferential edge portion of the through hole 41, and the through hole 41 is sealed.

Next, the end portion of the wire harness 30 is connected to a device. A portion of the wire harness 30 that is disposed inside the vehicle is bent as appropriate. At this time, as shown in FIG. 2, if the corrugated tube 33 is bent, the strip-shaped portion 22 is pulled up to a side that opposes the wall 40. Here, the protruding portion 21 that is lined up with the strip-shaped portion 22 is less likely to deform than the inner flange portion 17, deformation of the inner flange portion 17 accompanying the deformation of the strip-shaped portion 22 is suppressed. Then, the terminal fitting at the end portion of the wire harness 30 is connected to the device.

Thus, the operation for attaching the wire harness 30 is completed.

Next, the effects of the embodiment that is configured as described above will be described.

The grommet 10 according to this embodiment has the main body portion 11, which is fitted into the through hole 41 in the wall 40 and comes into close contact with the circumferential edge portion of the through hole 41, the through space 12, which is open in the same direction as the penetrating direction of the through hole 41, is formed in the main body portion 11, and the reinforcement member 25, which suppresses inward distortion of the main body portion 11, is provided in the through space 12. With this configuration, the shape of the main body portion 11 is maintained by the reinforcement member 25, and uniform adhesion to the circumferential edge portion of the through hole 41 is maintained over the entire circumference. Thus, the deterioration of waterproofness can be prevented.

Moreover, since the reinforcement member 25 is the corrugated tube 33 that passes through the main body portion 11, the sheathing member protecting the wire harness 30 can be used as the reinforcement member 25. Thus, a dedicated component serving as a reinforcement member need not be produced separately, and an increase in the number of components can be prevented. Moreover, the shape of the main body portion 11 can be maintained and deterioration of waterproofness can be prevented simply by performing a straightforward operation of inserting the corrugated tube 33 into the through space 12 of the main body portion 11.

Furthermore, the outer circumferential surface of the corrugated tube 33 is in close contact with the inner circumferential surface of the main body portion 11. With this configuration, a liquid-tight joint can be obtained between the grommet 10 and the corrugated tube 33 without having to perform a conventional operation of fixing an end portion of a corrugated tube to a grommet.

Other Embodiments

The present disclosure is not limited to the foregoing embodiment that has been described above and illustrated in the drawings, and, for example, the following embodiments are also embraced within the technical scope of the present disclosure.

(1) In the foregoing embodiment, a case where the reinforcement member 25 is the corrugated tube 33 has been described. However, the present disclosure is not limited to such a case, and a molded product, other than a corrugated tube, that is formed of resin or metal separately from a grommet may also be used as a reinforcement member.

(2) In the foregoing embodiment, a case where the through space 12 of the main body portion 11 has a circular cross-sectional shape has been described. However, the present disclosure is not limited to such a case, and a through space of a main body portion may have an elliptical or oval cross-sectional shape, for example.

(3) In the foregoing embodiment, specific examples of the number, shape, and the like of the lip portions 26 provided in the sealing portion 24 have been described. However, the present disclosure is not limited to these examples, and the number, shape, and the like of lip portions can be changed as desired.

What is claimed is:

1. A grommet comprising: a main body configured to fit into a through hole in a wall and come into close contact with a circumferential edge portion of the through hole; and a reinforcement provided in a through space in the main body and configured to suppress inward distortion of the main body, the through space being open in a same direction as a penetrating direction of the through hole, wherein the reinforcement is cylindrical and conforms to an inner circumferential surface of the main body, and is accommodated in the through space, and the inner circumferential surface of the main body includes a second circumferential surface that is located in close proximity to, or abuts against, an outer circumferential surface of the reinforcement and a first circumferential surface that is inclined so that an opening width of the main body gradually decreases from the second circumferential surface toward an end of the main body in an axial direction thereof, wherein the reinforcement is a corrugated tube that passes through the main body, and an outer circumferential surface of the corrugated tube is in close contact with the inner circumferential surface of the main body.

2. A wire harness comprising: a plurality of wires; a sheath that encloses the plurality of wires collectively; and the grommet according to claim 1.

\* \* \* \* \*